R. J. BROOKS.
FEED BAG.
APPLICATION FILED APR. 1, 1908.

917,534.

Patented Apr. 6, 1909.

Witnesses:

Inventor:
Roy J. Brooks
By Cheever & Cox
Att'ys

UNITED STATES PATENT OFFICE.

ROY J. BROOKS, OF CASSOPOLIS, MICHIGAN.

FEED-BAG.

No. 917,534.     Specification of Letters Patent.     Patented April 6, 1909.

Application filed April 1, 1908. Serial No. 424,477.

*To all whom it may concern:*

Be it known that I, ROY J. BROOKS, a citizen of the United States, residing at Cassopolis, in the county of Cass and State of Michigan, have invented a certain new and useful Improvement in Feed-Bags, of which the following is a specification.

My invention relates to feed bags, especially for horses and other draft animals, and the object of the invention is to provide a bag in which the grain may be stored until it is to be used, and by means of which the grain may be supplied to the animal at a moderate and practically uniform rate.

Feed bags of this general character are already known, see for example, the one shown in my prior patent 880,438 issued February 25, 1908, where it was necessary to invert the device in order to fill the outer or storage receptacle. As a result of the present invention the bag may be filled from the top without inverting it.

Figure 1:
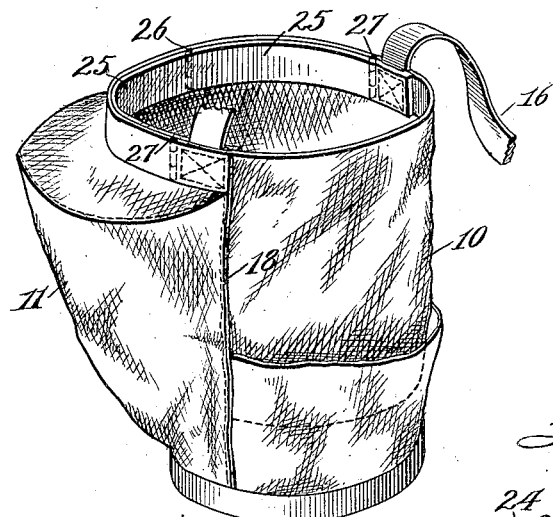
Figure 5:
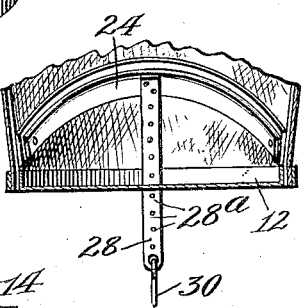
Figure 2:
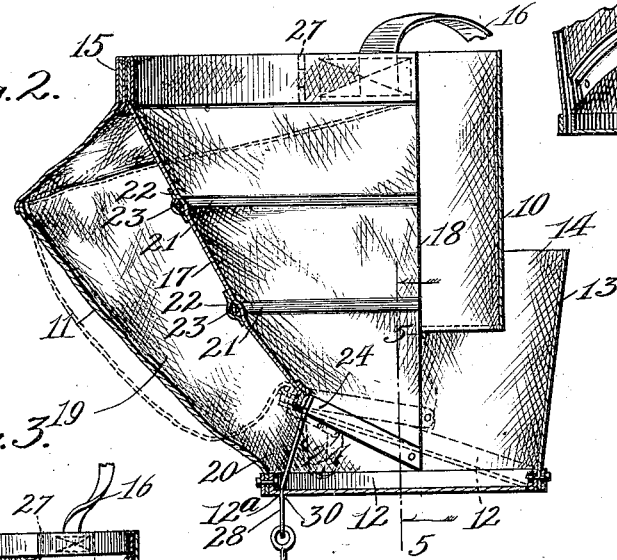
Figure 3:
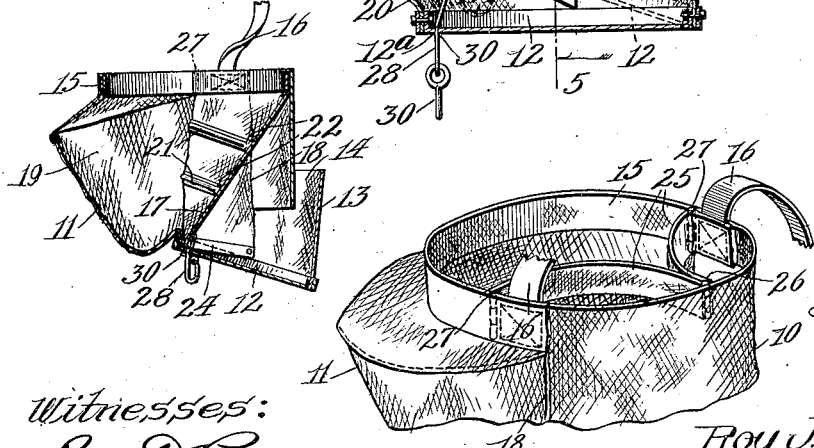
Figure 4:
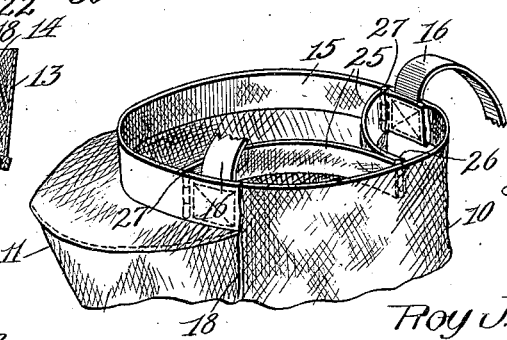

I accomplish my object by the means illustrated in the accompanying drawings, in which:

Figure 1 is a perspective view of a bag embodying my invention; Fig. 2 is a vertical sectional view thereof, the full lines showing the bag in condition for feeding the animal. The dotted lines indicate the position of the parts as they will be when the bag is full and is being transported. Fig. 3 is similar to Fig. 2 except that the parts are shown in the position which they will assume while the bag is being filled; Fig. 4 is a perspective view of the top of the bag showing the parts in the position which they will assume when the bag is being filled with grain, and Fig. 5 is a fragmentary sectional view taken on the line 5—5 Fig. 2.

Corresponding reference characters denote like parts throughout the views.

The outer or main receptacle consists of a bag having side walls 10 which bulge at the back 11 to form a storage receptacle 19 for the grain. The bag is provided with a closed bottom 12 and a flap 13 in front, designed to furnish an air shaft 14 through which the animal may be supplied with air during feeding, after the manner indicated in my above mentioned patent and elsewhere. The bag is reinforced at the top by a rim 15 which consists of some resilient material preferably metal. This rim, in the preferred construction, extends only around the rear half of the bag and is semi-circular in form. The bag is supported by means of straps 16 intended to pass over the head of the animal in the usual manner. Inside of the bag is secured a wall 17 of canvas or other fabric. This is secured, preferably at diametrically opposite sides of the bag by vertical rows of stitching 18. The precise construction is immaterial, the essential feature being that the inner wall completes the receptacle or pocket 19 for the storage of grain. Wall 17 does not extend to the bottom of the outer receptacle when the parts are in normal feeding condition, shown in full lines in Fig. 2, but stops somewhat short, thereby affording a passage 20 between its lower edge and the bag bottom 12. The inner wall is desirably braced against collapsing by means of the horizontal ribs 21, 21, which consist preferably of wires held in position by stitching canvas strips 22 over them, as best indicated in Fig. 2. These are preferably jointed at the middle of the bag (at 23 Fig. 2) in any suitable manner.

A stiffening rib 24 is desirable at the lower edge of the inner wall. Means are provided at the upper edge of the inner wall 17 for holding the same in close contact with the stiffening rim 15 to close the grain receptacle when the device is being transported. In the preferred construction shown, these means consist of two quadri circular ribs 25 hinged together at the point 26 and hinged to the rim 15 at the points 27 located near the ends of said rim. The construction is such that when the parts are in normal position (Figs. 1 and 2) the stiffness of the ribs 25 and of the rim 15 will hold said ribs in close contact with the rim and will, consequently, close the receptacle 19. As the rim 15 is resilient, however, an opening may be made at the top of the grain receptacle by merely grasping the ribs 25 near the hinged joint 26 therein and forcibly pulling them away from the rim 15. The ends of said rim will then spread and permit ribs 25 to be swung inward to the position shown in Fig. 4. This leaves an opening at the top of the grain receptacle and after the receptacle is filled it may be again closed by springing the ribs 25 back to the position close to the rim 15. By preference the ribs 25 are themselves formed of some resilient material preferably metal so that they too yield somewhat when they are being sprung into open position.

In order to close the passage 20, an aperture 12ª is formed in the bag bottom 12 and a strap 29 is passed through it, the upper extremity of the strap being attached to the lower portion of wall 17. Said strap has a series of apertures 21ª as shown in Fig. 5 and a pin 30 may be inserted into any one of said apertures 28ª beneath the bag bottom to hold the latter at any desired elevation.

In operation when it is desired to open the receptacle for charging it, all that is necessary is to grasp the inner ribs 25 and swing them to the position shown in Fig. 4. On account of the resilience of the rim 15 and ribs 25 they will maintain this position until force is exerted upon them to change the position. After the storage receptacle has been filled it may be closed by springing the ribs 25 back into contact with the rim 15. The bag may then be transported without danger of its accidentally opening up. It will thus be seen that the bag automatically maintains itself in open position when open and in closed position when closed. When the bag is to be transported with grain in it the bottom 12 is moved up along strap 28 until it reaches the rib 24 at the lower edge of the inner wall. The passage 20 will then be closed and the grain will be contained within the receptacle 19. When the animal is to be fed the bottom 12 is lowered as far as desirable. If the passage is to be only partially opened the pin 30 may be placed in the proper apertures 28ª in strap 28, the bag bottom then resting upon said pin. By preference the parts are so proportioned that when the pin is withdrawn the bag bottom will fall far enough to leave an opening of such size as to supply grain at the rate usually required by the animal.

What I claim as new and desire to secure by Letters Patent, is:

1. A feed bag comprising an outer bag with a closed bottom and an inner wall secured to the sides of the outer bag to form a storage receptacle, said inner wall falling short of the bottom to form a passage from the storage receptacle to the center of the bag, means for holding the bottom in position to close said passage, and members secured to the upper edge of the inner wall for holding it in contact with the outer bag to close the storage receptacle, said members being adapted to be withdrawn, in part, from the sides of the outer bag whereby the storage receptacle may be filled from the top.

2. A feed bag comprising an outer bag with a closed bottom and an inner wall secured to the sides of the outer bag to form a storage receptacle, said inner wall falling short of the bottom to form a passage from the storage receptacle to the center of the bag, means for holding the bottom in position to close said passage, and members secured to the upper edge of the inner wall for holding it in contact with the outer bag to close the storage receptacle, said members being hinged to each other and to the outer bag and adapted to be swung away from the sides of the outer bag to permit the filling of the storage receptacle.

3. A feed bag comprising an outer bag with a closed bottom and a stiffening rim at the top and an inner wall adapted to form a storage receptacle, said inner wall falling short of the bottom to form a passage from the storage receptacle to the center of the bag, means for holding the bottom in position to close said passage, and ribs secured to the upper edge of the inner wall for holding it in contact with said stiffening rim to close the storage receptacle, said ribs being hinged together and to said stiffening rim and adapted to be swung inward from the sides of the outer bag to permit the filling of the storage receptacle.

4. A feed bag comprising an outer bag with a closed bottom and a resilient stiffening rim at the top, and an inner wall adapted to form a storage receptacle, said inner wall falling short of the bottom to form a passage from the storage receptacle to the center of the bag, means for holding the bottom in position to close said passage, and ribs secured to the upper edge of the inner wall for holding it in contact with said stiffening rim to close the storage receptacle, said ribs being hinged together and to said stiffening rim and adapted to be swung inward therefrom to permit the filling of the storage receptacle.

5. A feed bag comprising an outer bag with a closed bottom, a semi circular resilient metallic stiffening rim secured to the upper portion of the outer bag, an inner wall of flexible fabric secured by means of vertical rows of stitching to the sides of the bag and adapted to form a storage receptacle for grain within the bag, said inner wall having horizontal stiffening ribs at its bottom and at various heights above the bottom, the inner wall being shorter than the height of the outer bag whereby a grain passage is formed between them, means for regulating the amount of opening in said passage and two practically quadri circular stiffening ribs secured to the upper edge of the inner wall and hinged together at their inner ends and at their outer ends hinged to the outer ends of said stiffening rim at the top of the outer bag and adapted to fit closely against the stiffening rim at the top of the outer bag for normally holding the grain receptacle closed substantially as described.

6. In a feed bag, the combination with the bag proper of an inner wall secured within the bag and extending from one side to the other to form a grain receptacle, there being a passage beneath the lower edge of said wall, means for regulating the amount of opening in said passage, and stiffening members at the top of the bag and the top of the inner wall for automatically holding the grain receptacle closed when the receptacle is closed and open when the receptacle is opened.

In witness whereof, I have hereunto subscribed my name in the presence of two witnesses.

ROY J. BROOKS.

Witnesses:
  HOWARD M. COX,
  C. J. CHRISTOFFEL.